United States Patent
Wang et al.

(10) Patent No.: US 10,969,922 B2
(45) Date of Patent: *Apr. 6, 2021

(54) MESSAGING SYSTEM FOR PROVIDING MULTI-ZONE MESSAGES

(71) Applicant: SAP SE, Walldorf (DE)

(72) Inventors: Chongyao Wang, Shanghai (CN);
Filiberto Selvas, San Carlos, CA (US)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,741

(22) Filed: Aug. 5, 2019

(65) Prior Publication Data

US 2019/0354216 A1 Nov. 21, 2019

Related U.S. Application Data

(63) Continuation of application No. 15/267,509, filed on Sep. 16, 2016, now Pat. No. 10,416,831.

(51) Int. Cl.
*G06Q 30/00* (2012.01)
*G06F 3/048* (2013.01)
(Continued)

(52) U.S. Cl.
CPC ......... *G06F 3/048* (2013.01); *G06Q 30/0257* (2013.01); *G06Q 30/0601* (2013.01);
(Continued)

(58) Field of Classification Search
None
See application file for complete search history.

(56) References Cited

U.S. PATENT DOCUMENTS

| 9,275,476 B1* | 3/2016 | Killalea | G06Q 30/00 |
| 2008/0208975 A1* | 8/2008 | Olive | G06F 16/95 |
| | | | 709/205 |

(Continued)

OTHER PUBLICATIONS

Bickart, Barbara, Internet Forums as Influential Sources of Consumer Information, 2001, Journal of Interactive Marketing, Issue 3, pp. 31-40 (Year: 2001).*

(Continued)

*Primary Examiner* — Jeffrey A. Smith
*Assistant Examiner* — Timothy J Kang
(74) *Attorney, Agent, or Firm* — Schwegman Lundberg & Woessner, P.A.

(57) ABSTRACT

Systems and methods are provided for receiving input for a message, including a comment from a user, in a first zone of a message area of a graphical user interface of a first interface, the graphical user interface comprising the message area comprising the first zone to allow the user to enter a comment and a second zone to allow the user to insert item details by accessing an item list generated from a database. The systems and method further providing for detecting input in the comment from the user indicating a request for an item list associated with the input, accessing the database to generate the item list based on the input entered by the user wherein the item list is displayed to the user, detecting a selected item in the item list displayed to the user, generating item details associated with the selected item wherein the item details are inserted in the second zone of the message area of the graphical user interface.

20 Claims, 13 Drawing Sheets

(51) Int. Cl.
    *G06Q 30/06*     (2012.01)
    *G06Q 50/00*     (2012.01)
    *G06Q 30/02*     (2012.01)
    *H04L 12/58*     (2006.01)
    *H04L 29/08*     (2006.01)

(52) U.S. Cl.
    CPC ..... *G06Q 30/0631* (2013.01); *G06Q 30/0633* (2013.01); *G06Q 50/01* (2013.01); *H04L 51/32* (2013.01); *H04L 67/02* (2013.01)

(56) References Cited

U.S. PATENT DOCUMENTS

| | | |
|---|---|---|
| 2012/0265637 A1 | 10/2012 | Moeggenberg |
| 2015/0127489 A1* | 5/2015 | Vasthimal .......... G06Q 30/0625 705/26.62 |
| 2015/0334072 A1 | 11/2015 | Agarwal et al. |
| 2018/0082351 A1 | 3/2018 | Wang et al. |

OTHER PUBLICATIONS

"U.S. Appl. No. 15/267,509, Corrected Notice of Allowability dated Jun. 12, 2019", 5 pgs.

"U.S. Appl. No. 15/267,509, Examiner Interview Summary dated Feb. 25, 2019", 3 pgs.

"U.S. Appl. No. 15/267,509, Non Final Office Action dated Dec. 4, 2018", 13 pgs.

"U.S. Appl. No. 15/267,509, Notice of Allowance dated May 8, 2019", 8 pgs.

"U.S. Appl. No. 15/267,509, Response filed Feb. 13, 2019 to Non Final Office Action dated Dec. 4, 2018", 12 pgs.

Bickart, Barbara, "Internet Forums as Influential Sources of Consumer Information", Journal of Interactive Marketing, (2001), 31-40.

* cited by examiner

FIG. 6B

YOUR CART    CART ID: 00011000

| ITEM | | ITEM PRICE | QUANTITY | SHIPPING | TOTAL |
|---|---|---|---|---|---|
| | EASYSHARE Z730 Zoom Digital Camera | $147.04 | 1<br>Update<br>Remove | ⦿ Ship<br>○ Pickup | $147.04 |
| | High Quality Tripod | $925.82 | 1<br>Update<br>Remove | ⦿ Ship<br>○ Pickup | $925.82 |

[CHECKOUT]

ORDER TOTALS
Subtotal      $1,072.86
Total:      $1,072.86
Your order includes $51.09 tax.

MESSAGING SYSTEM FOR PROVIDING MULTI-ZONE MESSAGES

CROSS-REFERENCE TO RELATED APPLICATIONS

This application is a continuation of prior application Ser. No. 15/267,509, filed on Sep. 16, 2016, which is incorporated by reference herein in its entirety.

BACKGROUND

Traditionally, online communities have been used to offer context, answers, and solutions related to particular items, such as products and services. These communities, however, do not offer a way to access and share details related to items or subjects discussed in the communities.

BRIEF SUMMARY

In some implementations, methods and apparatus, including computer program products, provide for multi-zone messages. In one aspect, a server computer may receive input for a message, including a comment from a user, in a first zone of a message area of a graphical user interface of a first interface, the graphical user interface comprising the message area comprising the first zone to allow the user to enter a comment and a second zone to allow the user to insert item details by accessing an item list generated from a database. The server computer may detect input in the comment from the user indicating a request for an item list associated with the input, wherein the input in the comment from the user includes a special character indicating the request for the item list. The server computer may further access the database to generate the item list based on the input entered by the user wherein the item list is displayed to the user. The server computer may detect a selected item in the item list displayed to the user and generate item details associated with the selected item wherein the item details are inserted in the second zone of the message area of the graphical user interface. The server computer may further receive an indication from the user to post the message including the first zone comprising user comments and the second zone comprising the item details, and cause the message to be posted to a document to be accessed by other users. The server computer may receive, via the first interface, a request to add the selected item to the first shopping cart, and add the selected item to the first shopping cart. The server computer may receive, via a second interface, a request to add a second item to a second shopping cart, and add the second item to the second shopping cart. The server computer may receive a request from the user to check out, merging the first shopping cart and the second shopping cart to generate a merged shopping cart with items from the first shopping cart and the second shopping cart, and provide the merged shopping cart to be displayed to the user.

The above methods, apparatus, and computer program products may, in some implementations, further include one or more of the following features. The item list may be generated based on the user input after the special character. The items details inserted in the second zone of the message area may include a mechanism for adding the selected item to a first shopping cart. Information associated with the selected first item added to the shopping first cart may be stored in an http session associated with the user. Information associated with the second item added to the second shopping cart may be stored in an http session associated with the user. Merging the first shopping cart and the second shopping cart to generate a merged shopping cart with items from the first shopping cart and the second shopping cart may comprise accessing http session data to get information associated with the first shopping cart and information associated with the second shopping cart, and combining the information associated with the first shopping cart and the information associated with the second shopping cart into the merged shopping cart. Generating the item list based on the input entered by the user comprises accessing an index to determine relevant items to include in the item list. Before receiving a request for the item list, retrieving a third party item list from a third party server, indexing the third party item list and storing the indexed third party item list, retrieving third party item details associated with the third party item list, and storing the third party item details. The third party item list and the third party item details may be periodically updated. Periodically updating the third party item list and third party item details may include retrieving an updated third party item list from the third party server, retrieving an associated item list from a database, comparing the updated third party item list from the third party server and the associated item list from the database, and updating the third party item list in the database based on a determination that there are differences between the updated third party item list from the third party server and the associated item list from the database. Receiving a request from the third party server to update the third party item details and updating the associated item details stored in the database based on the updates indicated in the request.

The details of one or more variations of the subject matter described herein are set forth in the accompanying drawings and the description below. Other features and benefits of the subject matter described herein will be apparent from the description and drawings, and from the claims.

BRIEF DESCRIPTION OF THE DRAWINGS

Various ones of the appended drawings merely illustrate example embodiments of the present disclosure and should not be considered as limiting its scope.

FIGS. 6A-6C illustrate example interfaces, according to some example embodiments.

FIGS. 8A-8B illustrate example interfaces, according to some example embodiments.

DETAILED DESCRIPTION

Figure 1:
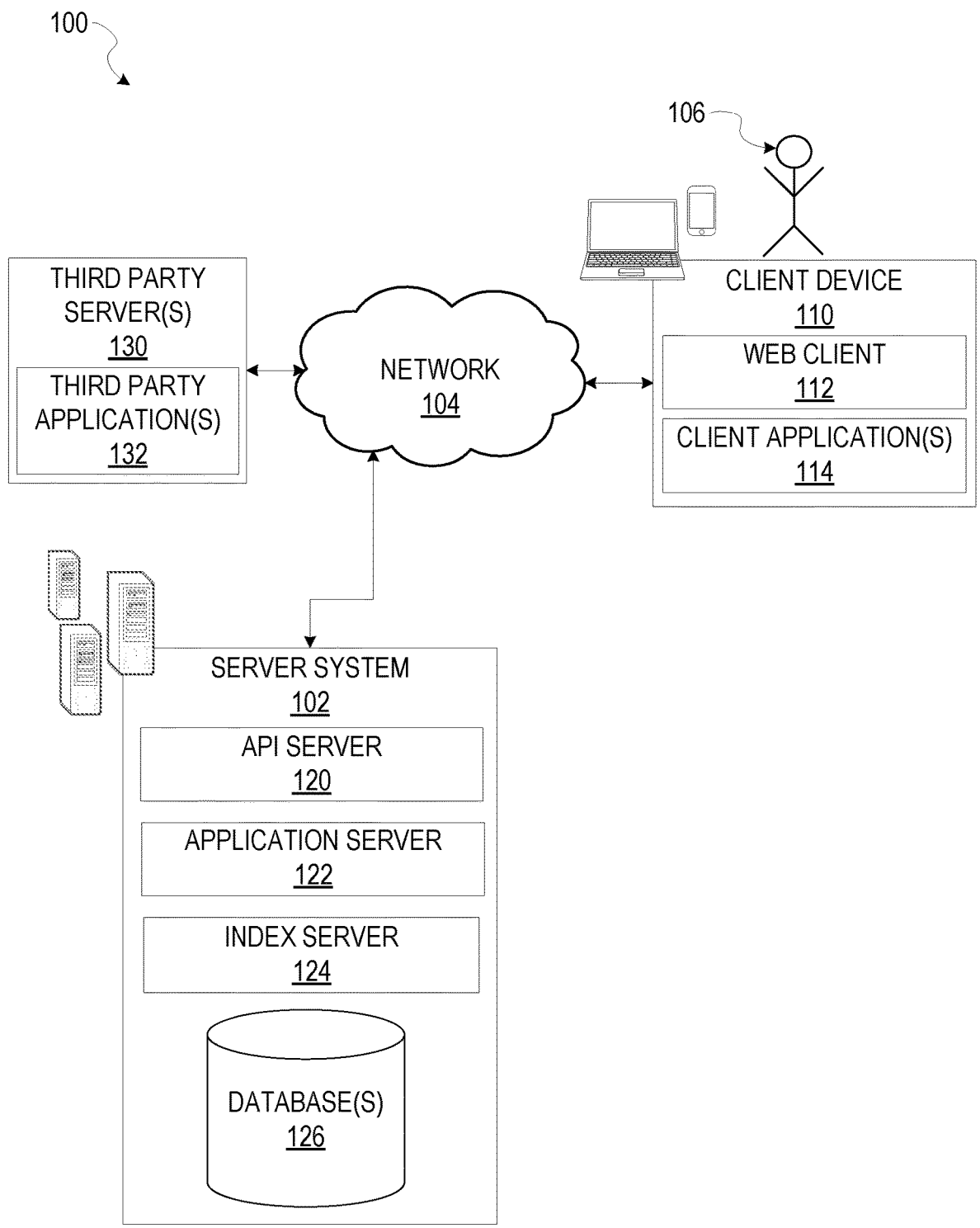
FIG. 1 is a block diagram illustrating a networked system, according to some example embodiments.

Systems and methods described herein relate to a messaging system for providing multi-zone messages. In particular, a messaging system is described for integration and synchronization of commerce content and social content. As explained above, traditionally, online communities have been used to offer context, answers, and solutions related to particular items, such as products and services. These communities, however, do not offer a way to access and share details related to items or subjects discussed in the communities and are disconnected from the commerce portion of the process to actually purchase the items discussed or recommended in the communities. For example, a user may be looking for an item such as a camera to take on vacation. The user may be particularly looking for a camera that is good in low light. The user may search for low light cameras in a search engine in a web browser (e.g., Chrome, Internet Explorer, Safari, etc.). The user may read various articles describing what features to look for in a camera for low light settings, recommendations of different cameras, user and professional reviews of the cameras, the user may post questions about various products, and so forth. In addition, the user may need some accessories such as an extra battery, a camera case, a tripod, etc. The user would have to do a new search for each of these items and read articles, reviews, and so forth for these items as well. The user may need to keep notes or save websites or try to remember the different cameras, model numbers, and accessories that were recommended.

Then the user would need to go to a commerce website to actually purchase the camera and accessories. Or, more likely, the user would have to go to multiple commerce websites to find the different items for purchase. It may be difficult to remember which item models were recommended or hard to determine if the item that the user finds on the commerce website is the same as the one the user read about in the articles or reviews.

Accordingly, embodiments described herein provide for integration and synchronization between social content, such as the articles, reviews, recommendations, and so forth, and purchasing items. In one example, embodiments described herein allow a user who is viewing an article, discussion, or other form of online community forum to be able to add a message including a comment with an item "card" (e.g., a "product card") that includes item details for the item and a button to add an item to a shopping cart for purchase. For example, a user may be viewing an article on a website sponsored by a particular entity that sells items relating to photography. The article may be describing things to consider when taking photographs in low light. After the article there may be an area where users may post messages such as comments asking questions, answering questions, providing recommendations, reviewing a particular items, and the like. The user may want to post a comment asking about a particular camera she is considering purchasing for low light photography. Embodiments described herein allow the user to include an item card for the camera in the comment so that other users may view the item details and any user may add the item to a shopping cart. In another example, the user may want to post a question about what accessories are recommended for a particular camera. The author of the article, a customer representative who sponsored the article, another user, etc. may include one or more item cards in a comment so that the user may view item details and add one or more items to a shopping cart.

Moreover, embodiments described herein allow for indexing and synchronizing item lists and item details between third party entities and the system described herein such that the indexed item lists may be used for providing an item list and item details for a "item card," to have updated data for shopping carts and purchase of the item, and so forth. Furthermore, embodiments described herein allow for merging of separate shopping carts (e.g., from different websites, applications, etc.) into a merged shopping cart for a user to view and edit the merged shopping cart and purchase items, via a merged shopping cart.

Accordingly, embodiments described herein allow for a smooth integration of the commerce process and community content. This provides a number of benefits for a user and entities providing the commerce aspect. For example, a user is able to purchase items directly in various community interfaces, or add them to one or more shopping carts, and then purchase them in one step via a merged shopping cart. In another example, commerce owners will be able to reach out to potential buyers in various community contexts to influence their purchase decisions, thus increasing potential sales. For example, an entity may host a particular community website with articles, reviews, questions and answers, and so forth, related to a particular topic (e.g., sports, fitness, healthy eating, photography, gardening, etc.).

FIG. 1 is a block diagram illustrating a networked system 100, according to some example embodiments. The system 100 may include one or more client devices such as client device 110. The client device 110 may comprise, but is not limited to, a mobile phone, a desktop computer, a laptop, a portable digital assistant (PDA), a smart phone, a tablet, an ultra book, a netbook, a laptop, a multi-processor system, a microprocessor-based or programmable consumer electronics, a game console, a set-top box, a computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user that is used to search and display information related to items (e.g., products and services), purchase items, and so forth. In one embodiment, the system 100 is a messaging system that provides for integration and synchronization between social content, such as articles, reviews, recommendations, and so forth, and purchasing the items related to the social content. For example, the messaging system may provide the ability to create a multi-zone message that incorporates a user comment and item details related to the comment.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., third party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more applications 114 (also referred to as "apps") such as, but not limited to, a web browser, messaging application, electronic mail (email) application, an e-commerce application, a social networking application, a mapping or location application, and the like. In some embodiments, one or more applications 114 may be included in a given one of the client device 110, and configured to locally provide the user interface and at least some of the functionalities with the application 114 configured to communicate with other entities in the system 100 (e.g., third party servers 130, server system 102, etc.), on an as-needed basis, for data and/or processing capabilities not locally available (e.g., to access item information, to purchase items, to authenticate a user 106, to verify a method of payment, etc.). Conversely, one or more applications 114 may not be included in the client device 110, and then the client device 110 may use its web browser to access the one or more applications hosted on other entities in the system 100 (e.g., third party servers 130, server system 102, etc.).

A server system 102 may provide server-side functionality via the network 104 (e.g., the Internet or wide area network (WAN)) to one or more third party servers 130 and/or one or more client devices 110. The server system 102 may be a cloud computing environment according to some example embodiments. In one example, the server system 102 may provide various functionality such as a commerce solution for ecommerce and item (e.g., product and/or service) content management. Various entities may utilize the functionality provided by the server system 102 by implementing applications that access the functionality provided by the server system 102, using applications provided by the server system 102, storing and synchronizing data in the server system 102, and so forth. In one example, the server system 102 may host a commerce website for one or more entities that provides an online community for users to view and share item information, search for items, and purchase items.

The server system 102 may include an application program interface (API) server 120, an application server 122, and an index server 124, that may be communicatively coupled with one or more databases 126. The one or more databases 126 may be storage devices that store information such as information related to products and services.

The index server 124 may provide functionality to index various item lists to be used to provide requested item lists related to user input. The API server 120, application server 122, and index server 124 may access one or more databases 126 to retrieve stored data to use in providing item information, item lists and item details, shopping cart mechanisms and information, merged shopping cart information, and so forth.

The system 100 may further include one or more third party servers 130. The one or more third party servers 130 may include one or more third party application(s) 132. The one or more third party application(s) 132, executing on third party server(s) 130, may interact with the server system 102 via API server 120 via a programmatic interface provided by the API server 120. For example, one or more the third party applications 132 may request and utilize information from the server system 102 via the API server 120 to support one or more features or functions on a website hosted by the third party or an application hosted by the third party. The third party website or application 132, for example, may provide a community for users to search for and review information related to items, ecommerce information for purchasing items, and so forth, which are supported by relevant functionality and data in the server the system 102.

In one example embodiment, the third party server 130 may be associated with an entity that provides items (e.g., products and services). For example, the entity may be a sporting goods company, an electronics company, an ecommerce company that sells various items, and so forth. The entity may further enable an online community for product and services discussion, information, recommendations, reviews, and so forth. To enable and access functionality provided by the server system 102, the entity, via a third party server 130, may provide an item list and item description to the server system 102 for the items provided by the entity. The server system 102 may index and store the item list and item details in one or more databases 126 to be used for providing item lists and details to users (e.g., to be included with user comments), to be used to add items to purchase to one or more shopping carts, to merge various shopping carts, and so forth.

Figure 2:
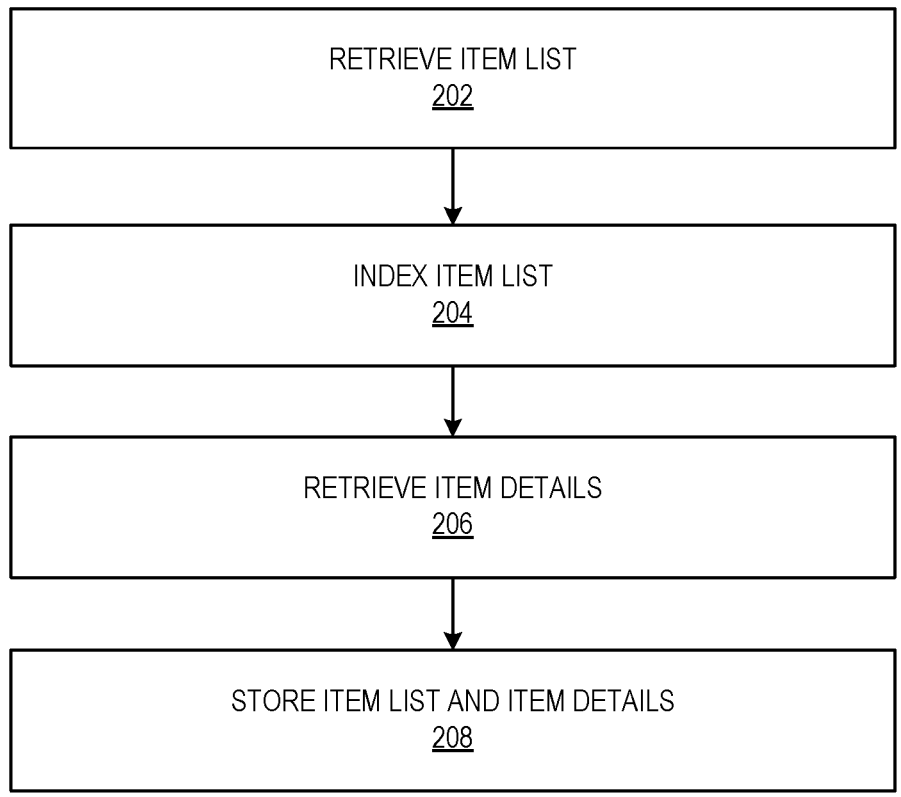
FIG. 2 is a flowchart illustrating aspects of a method, according to some example embodiments, for indexing item lists and storing item lists and related item details.

FIG. 2 is a flow chart illustrating aspects of a method 200, according to some example embodiments, for indexing an item list and storing the item list and related item details. For illustrative purposes, method 200 is described with respect to the networked system 100 of FIG. 1. It is to be understood that method 200 may be practiced with other system configurations in other embodiments.

In operation 202, the server system 102 retrieves an item list. For example, the server system 102 may retrieve a third party item list from a third party server 130 via API server 120. The third party item list may comprise a list of all of the items (e.g., goods and/or services) provided by a particular entity, or may comprise a subset of all of the items provided by the particular entity. An example API call made by the server system 102 to a third party server via an HTTPS get request (e.g., https://<www.commerceserver.com>/rest/v2/electronics/products/search?format=json) to retrieve a third party item list may comprise:

```
{
    "type": "product CategorySearchPageWsDTO",
    "currentQuery": {
        "query": {
            "value": ":relevance"
        },
        "url": "/search?q=%3Arelevance"
    },
    "freeTextSearch": " ",
    "pagination": {
        "currentPage": 0,
        "pageSize": 20,
        "sort": "relevance",
        "totalPages": 9,
        "totalResults": 179
    },
    "products": [
        {
            "availableForPickup" : true,
            "averageRating": 4.555555555555555,
            "code": "23355",
            "description": "Remote pan-handle with under-hand
grip controls zoom in/out, record start/stop, photo mode on/off approx.
1,505 mm <br><br/>Dimensions: minimum height approx. 735 mm
<br><br/>Weight: approx. 3.2 kg <br><br/>Tilting Angle: 90 degrees
down / 70 degrees up <br><br/>Quick-release Mounting shoe
<br><br/>Ball level for quick and easy Balance Function <br><br/>",
            "manufacturer": "Sony"
            "name": "Flagship tripod with remote control
and pan handle",
            "price": [
                "currencyIso": "USD",
                "formattedValue": "$580.38",
                "priceType": "BUY",
                "value": 580.38
            },
            "priceRange": { },
            "stock": {
                "stockLevelStatus": "inStock"
            },
            "summary": "Flagship tripod with remote control
and pan handle - designed for professionals!",
            "url": "/Open-Catalogue/Cameras/Camera-Accessories-
%26-Supplies/Tripods/Flaship-tripod-with-remote-control/"
        },
```

In operation 204, the server system 102 indexes the third party item list. In one example, the server system 102, via the index server 124, may generate an index from the third party item list that may be used for searching for particular items. For example, the index server 124 may analyze the item list for keywords, item identifiers, model numbers, item names, and so forth, to be able to efficiently access the data to generate item lists in response to input from a user.

In operation 206, the server system 102 retrieves item details associated with the item list. For example, the server system 102 may retrieve third party item details associated with a third party item list via API server 120. An example API call via an HTTPS get request (e.g., https://<www.commerceserver.com>/rest/v2/electronics/products/23355) to retrieve third party item details may comprise:

```
{
    "availableForPickup": true,
    "averageRating": 4.555555555555555,
    "categories": [
        {
            "code": "587"
        },
        {
            "code": "brand_5"
        }
    ],
    "code": "23355",
    "description": "Remote pan-handle with under-hand grip
controls zoom in/out, record start/stop, photo mode on/off approx.
1,505 mm <br><br/>Dimensions: minimum height approx. 735 mm
<br><br/>Weight: approx. 3.2 kg <br><br/>Tilting Angle: 90 degrees
down / 70 degrees up <br><br/>Quick-release Mounting shoe
<br><br/>Ball level for quick and easy Balance Function <br><br/>",
    "manufacturer": "Sony",
    "name": "Flagship tripod with remote control and pan handle",
    "numberOfReviews": 27
    "price": {
        "currencyIso": "USD",
        "formattedValue": "$580.38",
        "priceType": "BUY",
        "value": 580.38
    },
    "priceRange": { },
    "purchaseable": true,
    "stock": {
        "stockLevelStatus": "inStock"
    },
    "summary": "Flagship tripod with remote control and pan handle -
designed for professionals!",
    "url": "/electronics/products/23355"
}
```

The server system 102 may store the item list and item details, as shown in operation 208. For example, the server system 102 may store the third party item list and the third party item details in one or more databases 126.

An item list and item details from one or more entities may be periodically updated to account for inventory changes for items, price updates, description updates, and so forth. For example, the item list and item details may be sent by a third party server 130 periodically (e.g., every fifteen minutes, every hour, every few hours, daily, weekly, etc.) or the server system 102 may retrieve an item list and item details from the third party server 130 periodically. Accordingly, the third party item list and third party item details may be periodically synchronized with the item list and item details stored in one or more databases 126.

Figure 3:
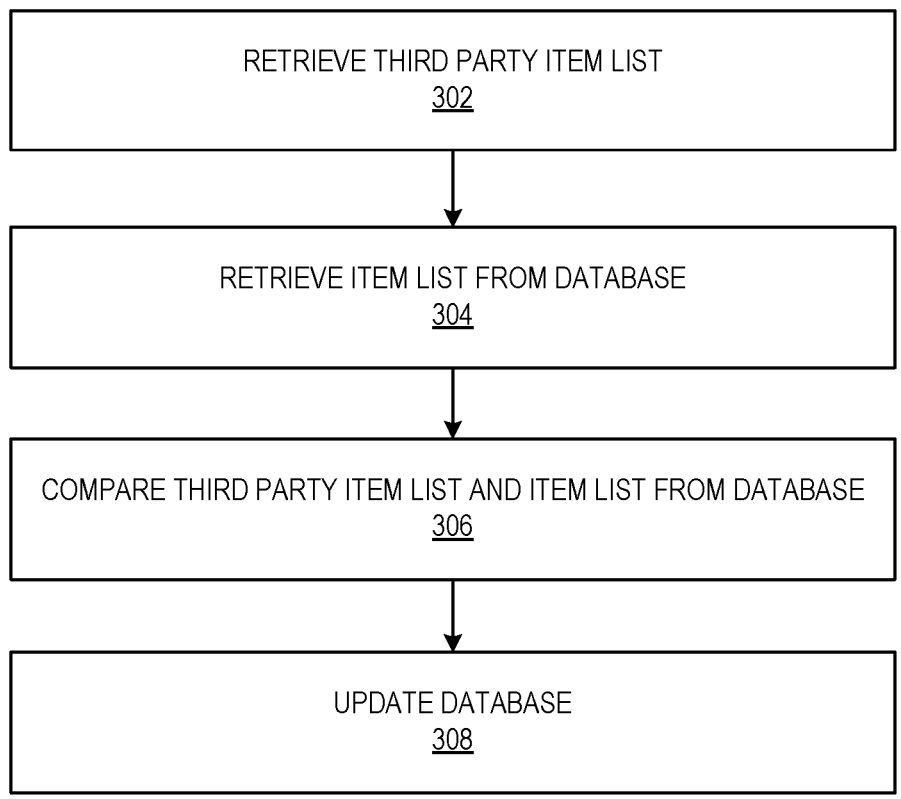
FIG. 3 is a flowchart illustrating aspects of a method, according to some example embodiments, for synchronizing an item list and associated item details.

FIG. 3 is a flow chart illustrating aspects of a method 300, according to some example embodiments, for synchronizing an item list and associated item details. For illustrative purposes, method 300 is described with respect to the networked system 100 of FIG. 1. It is to be understood that method 300 may be practiced with other system configurations in other embodiments.

In operation 302, the server system 102 retrieves an item list. For example, the server system 102 may retrieve a third party item list from a third party server 130 via API server 120. At operation 304, the server system 102 retrieves, or accesses, a related item list from one or more databases 126. At operation 306, the server system 102 compares the third party item list retrieved from the third party server 130 with the related item list stored in one or more databases 126 to determine whether there are any differences between the third party item list and the related item list stored in the one or more databases 126. If the server system 102 determines that there are changes in the third party item list, the server system 102 updates the item list and item details in the one or more databases 126 according to the changes in the third party item list. If the server system 102 determines that there are no changes, no updates are made to the item list and item details in the one or more databases 126.

One or more entities may want to push or send changes in an item list and item details, when the changes occur. In one example, a particular item may no longer be available. Accordingly, an entity may want to send the update to the server system 102 as soon as this occurs so that the server system 102 may remove the item or update the item to reflect that it is no longer available. In another example, an entity may simply send all updates as they occur so that the server system 102 is up-to-date.

Figure 4:
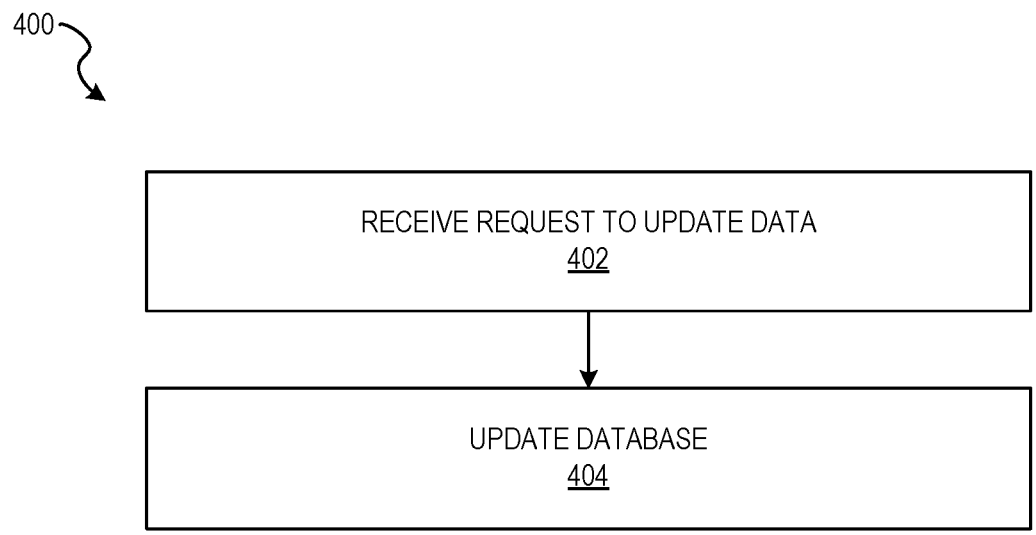
FIG. 4 is a flowchart illustrating aspects of a method, according to some example embodiments, for updating an item list and associated item details.

FIG. 4 is a flow chart illustrating aspects of a method 400, according to some example embodiments, for updating an item list and associated item details. For illustrative purposes, method 400 is described with respect to the networked system 100 of FIG. 1. It is to be understood that method 400 may be practiced with other system configurations in other embodiments.

In operation 402, the server system 102 receives a request to update data (e.g., a third party item list or third party item details) from a third party server 130. In one example, a third party server 130 may send data changes for an item list and/or item details to the server system 102 via API server 120. The server system 102 may receive the changes and then update one or more databases 126 to reflect the changes, as shown in operation 404. In another example, the third party server 130 may send a request to update data, the server system 102 may receive the request, and then the server system 102 may retrieve the updates from the third party server 130 and update the one or more databases 126.

One or more third party item lists may be indexed and stored in one or more databases 126 along with associated item details. This data may then be used to provide item lists and item details to a user that is searching for various items, posting questions or answers related to various items, and so forth.

Figure 5:
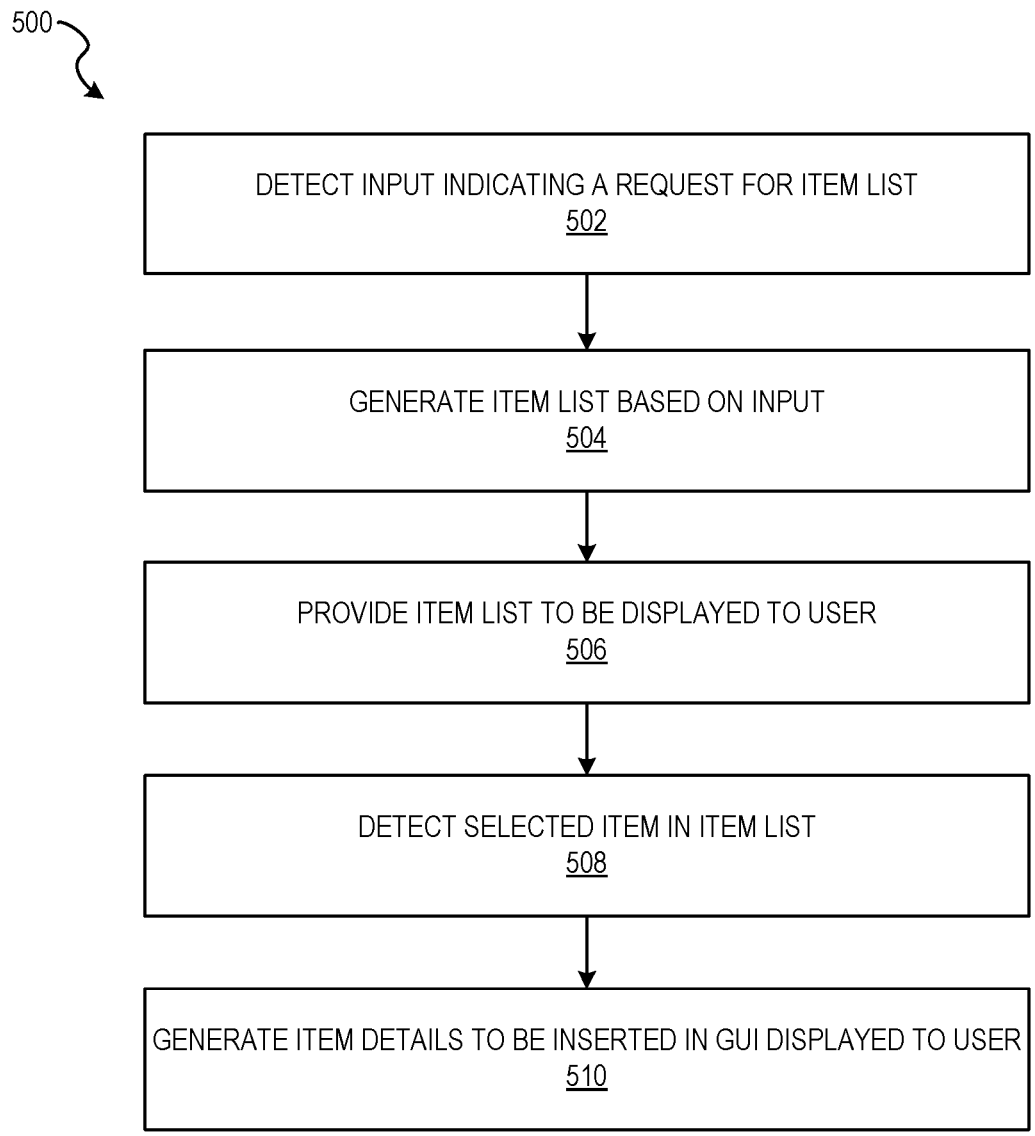
FIG. 5 is a flowchart illustrating aspects of a method, according to some example embodiments, for generating an item list and item details.

FIG. 5 is a flow chart illustrating aspects of a method 500, according to some example embodiments, for generating an item list and item details based on user input. For illustrative purposes, method 500 is described with respect to the networked system 100 of FIG. 1, and FIGS. 6A-6C. It is to be understood that method 500 may be practiced with other system configurations in other embodiments.

A graphical user interface (GUI) may be generated comprising a first zone, to allow a user to enter comments, and a second zone, to allow the user to insert item details by accessing an item list generated from a database. In one example, the GUI may be generated by a third party server 130 to be displayed on a client device 110. In another example, the GUI may be generated by the client device 110. In yet another example, the GUI may be generated by the server system 102 (e.g., via application server 122) to be displayed on the client device 110. The GUI may comprise a message area comprising a first zone to allow a user to enter a comment and a second zone to allow the user to insert item details by accessing an item list generated from a database. The server system 102, may receive input for a message, including a comment from a user, in the first zone of a message area of the graphical user interface of a first interface.

In operation 502, the server system 102 detects input in the comment from the user indicating a request for an item list associated with the input. In one example, a user may be using a first interface displayed on a client device 110. For example, the interface may be a webpage or application to post a comment, question, answer, etc. related to a particular item. In one example, FIG. 6A shows a first interface 600 including an article related to low light photography and user comments 602 related to the article. For example, a user may post a comment about what may have worked best for them for taking photographs in low light. The author may respond with additional products or advice. A product expert may comment with recommendations for other related products or services. An entity may be sponsoring the article and may comment to respond to questions about particular products and services, and so forth. Accordingly, a user may be anyone who is using the interface and providing comments (e.g., consumer, expert, author, customer support representative, etc.).

Figure 6B:
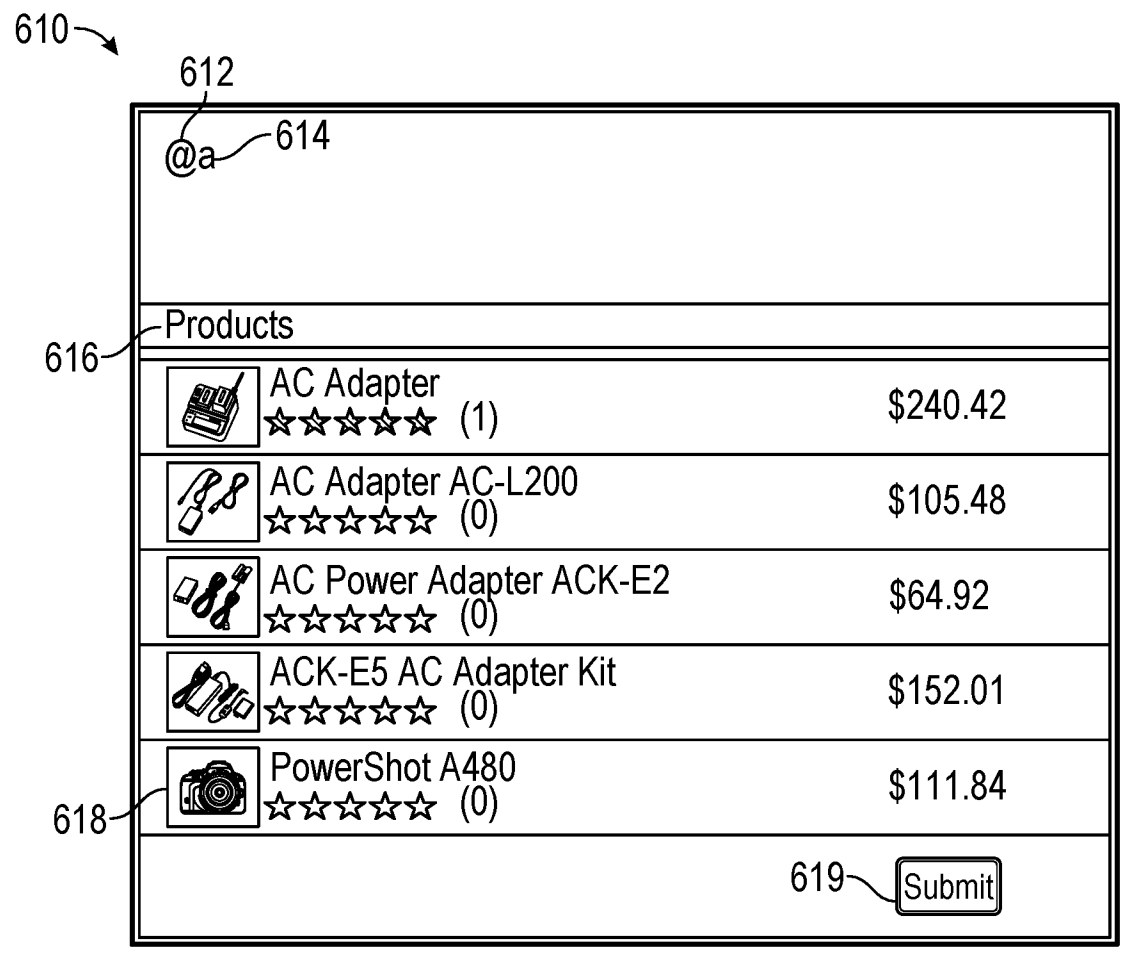

FIG. 6B shows an example interface 610 for a user to enter a comment. The interface 610 may be a GUI comprising a message area comprising a first zone for the user to enter a comment, as described above. The user may use a special or specific character 612 when entering a comment to indicate that he wishes to insert an item and related description. In this example, the user types in a "@" symbol and then starts typing in an item name, model number, service description, or the like. The server system 102 detects the input from the user (e.g., via application server 122) and determines that the user has input a special character. For example, the server system 102 may detect the input from the user by receiving the input via a client device 110 displaying the interface 610 or via a third party server 130. The special character indicates a request for an item list related to what the user inputs after the special character.

Returning to FIG. 5, in operation 504, the server system 102 (e.g., via application server 122) generates an item list based on the user input. For example, the server system 102 may access one or more databases 126 to generate the item list based on the input entered by the user. Referring again to the example in FIG. 6B, after the special character 612 the user may input the letter "a" 614. The server system 102 may determine which items start with the letter "a" 614 and cause an item list 616 to be displayed that lists the relevant items. For example, the server system 102 may access an indexed item list to determine which items (e.g., by item name, model number, keyword, item identifier, etc.) are relevant (e.g., that match or are similar to) what the user is inputting into the interface 610. The server system 102 may start populating this item list 616 based on what the user is inputting. The server system 102 may access an indexed item list associated with a single entity or more than one indexed item list associated with one or more entities.

Returning to FIG. 5, the server system 102 generates the item list based on the user input, as shown in operation 504, and provides the item list to be displayed to the user, as shown in operation 506. The user may select an item from the list to be included in the comment (e.g., in a second zone of the message area in the GUI). For example, the user may select the camera item 618 as shown in FIG. 6B. In one example, the user may then select a submit option 619 to submit the selection.

Figure 6C:
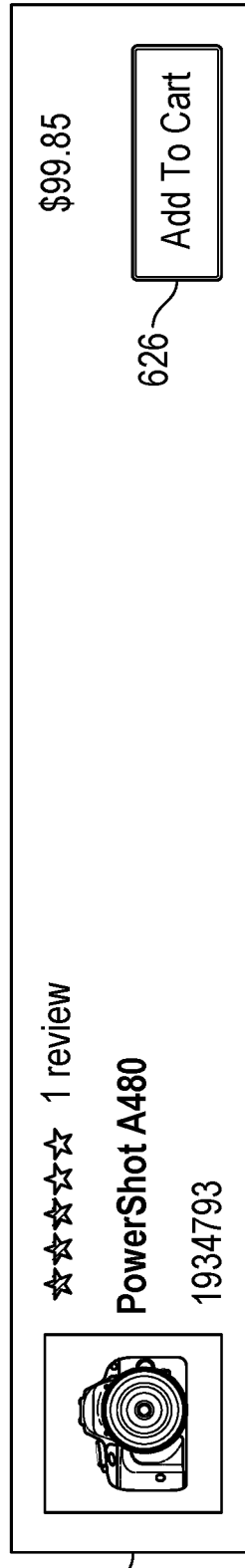

In operation 508, the server system 102 detects the selected item in the item list. The server system 102 may access the item details associated with the selected item in one or more databases 126. In operation 510, the server system 102 generates the item details 622 associated with the selected item, to be displayed as part of comments 624 related to the selected item, as shown in FIG. 6C. For example, the server system 102 may access one or more databases 126 to generate the item details associated with the selected item. The item details are inserted into the second zone of the message area of the GUI. For example, the item details 622 are displayed as an item "card." Item details 622 may include information associated with the item such as the name of the item, an item model number, an item identifier, a price for the item, a rating, reviews, an item description, and the like.

The user may then post the message with the comment and item details so that other users may review the message and respond to the message. For example, the server system 102 may receive an indication from the user to post the message including the first zone comprising user comments and the second zone comprising item details. The server system 102 may cause the message to be posted to a document to be accessed by the user and other users. For example, the message may be posted on a webpage or within an application. The message may then be viewable by other users to access, interact with, and respond to the message. For example, a user may be able to read the message, reply to the message, add the item in the message to a shopping cart (e.g., via a button included in the item details of the message), and so forth.

The item details 622 displayed to the user may include a mechanism for adding the selected item to a shopping cart. For example, the item details 622 may include a button 626 to add the item to a shopping cart, as shown in FIG. 6C.

Figure 7:
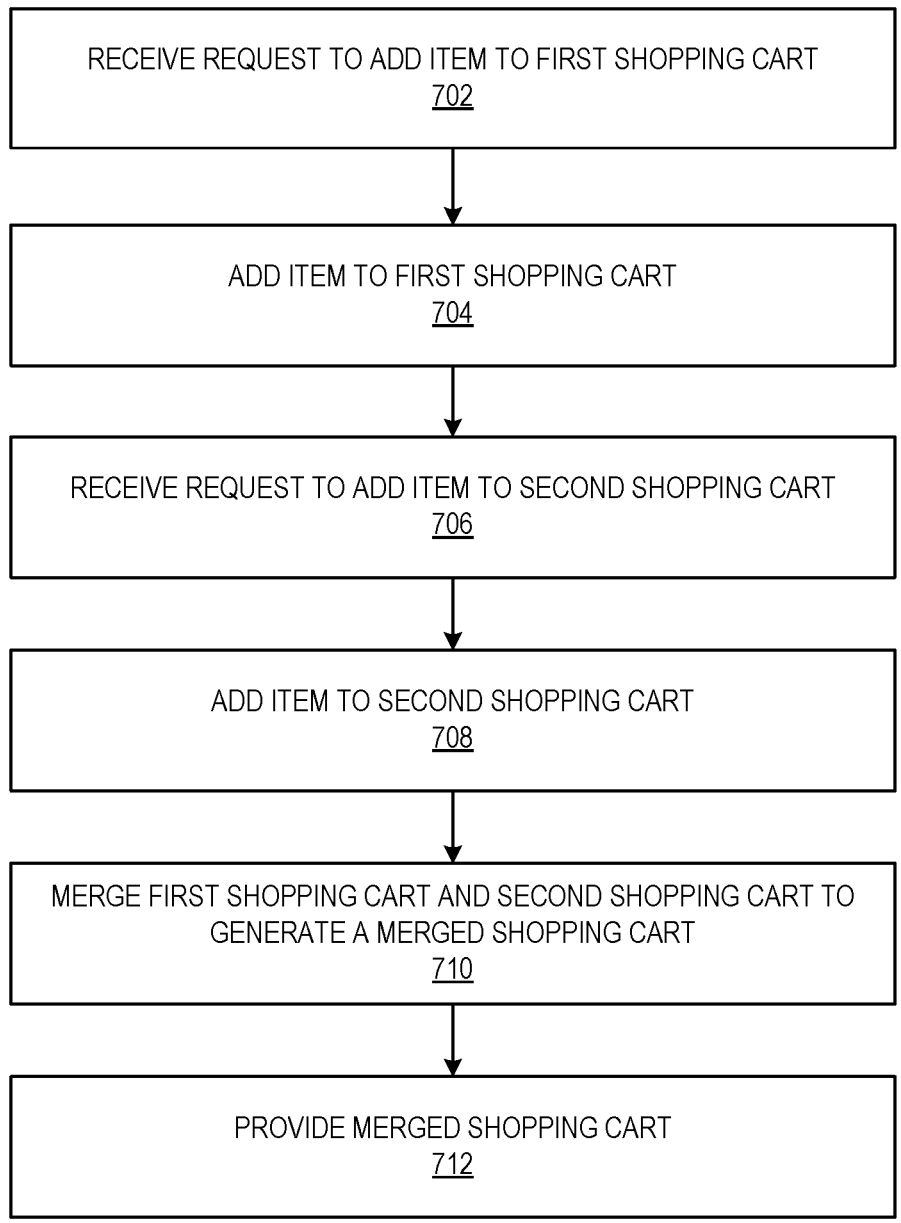
FIG. 7 is a flowchart illustrating aspects of a method, according to some example embodiments, for generating a merged shopping cart.

FIG. 7 is a flow chart illustrating aspects of a method 700, according to some example embodiments, for generating a merged shopping cart. For illustrative purposes, method 700 is described with respect to the networked system 100 of FIG. 1, FIG. 6C, and FIGS. 8A-8B. It is to be understood that method 700 may be practiced with other system configurations in other embodiments.

In operation 702, the server system 102 receives a request to add an item to a first shopping cart. In one example, the server system 102 may receive the request to add an item to a first shopping cart via a first interface on a client device 110. For example, a user may select a button (e.g., button 626) to add an item to a cart from a comment in the first interface 620, as shown in FIG. 6C. The client device 110 may send the request to the server system 102 via the application server 122, or the client device 110 may send the request to the third party server 130 and the third party server 130 may send the request to the server system 102 via the API server 120.

Figure 8A:

In operation 704, the server system 102 adds the item to the first shopping cart. For example, the server system 102 may store the item, user information, and so forth, in one or more databases 126 and associate the item and user information, etc., with the first shopping cart. For instance, after the user indicates he wishes to add an item to the first shopping cart (e.g., by selecting a button, etc.), the information related to the item is stored in an http session associated with the user. For example, the information may be associated with a user logon (e.g., username) or may be associated with an anonymous user if the user has not logged on. In this way, the server system 102 may access the http session data to get the information related to the item for the first shopping cart. Example code to get data from the first shopping cart may comprise: final CartData cartData= cartFacade.getSessionCartWithEntryOrdering(true); //get shopping cart via http session The user may then navigate to another webpage, website, or application to search for another item. For example, after adding a camera to a shopping cart on a first interface (e.g., webpage, website, application, etc.) the user may search for recommendations for one or more accessories for the camera, such as a tripod. The user may read reviews and ask questions about the right tripod for the selected camera. Once the user decides on which tripod to purchase, the user may add the tripod to a second shopping cart in a second interface. The first interface and the second interface may be associated with the same entity or with different entities. In operation 706, the server system 102 receives a request to add a second item to a second shopping cart. In operation 708, the server system 102 adds the second item to the second shopping cart. In one example, an indication may be provided to the user that the tripod has been added to the shopping cart, as shown in FIG. 8A. For example, FIG. 8A shows a second interface 800 and a display 802 showing that the tripod has been added to the second shopping cart. The server system 102 may store data related to the user and the second shopping cart, as explained above with respect to the first shopping cart.

The user may then be ready to check out and purchase the items in the first shopping cart and the second shopping cart. The user may select an option to check out from the first interface or the second interface, or another interface. For example, a user may be using a web browser to view different webpages and websites. A menu bar in the web browser may contain a menu item to check out. In another example, the particular web page that the user is viewing may have an option to view the shopping cart or check out. The server system 102 may receive a request to check out. For example, a user may select a button to check out via an interface on a client device 110. The client device 110 may send the request to the server system 102 via application server 122, or the client device 110 may send the request to third party server 130 and the third party server 130 may send the request to the server system 102 via the API server 120.

In operation 710, the server system 102 merges the first shopping cart and the second shopping cart to generate a merged shopping cart. For example, the server system 102 may access http session data to get the information related to the first shopping cart and the second shopping cart (and any other shopping carts). The server system 102 may then combine the information related to the first shopping cart and the second shopping cart into one merged shopping cart. Example code for generating a merged shopping cart may comprise:

```
final CartData cartData =
cartFacade.getSessionCartWithEntryOrdering(true);
// get cart information from session
      boolean hasPickUpCartEntries = false;
      for (final OrderEntryData entry : cartData.getEntries( ))// loop
the orders in cart
      {   // merge individual shopping carts
        if (!hasPickUpCartEntries &&
entry.getDeliveryPointOfService( ) != null)
        {
          hasPickUpCartEntries = true;
        }
        final UpdateQuantityForm uqf = new UpdateQuantityForm( );
        uqf.setQuantity(entry.getQuantity( ));
        params.put("updateQuantityForm" +
        entry.getEntryNumber( ), uqf);
      }
```

For example, the merged shopping cart comprises the first item from the first shopping cart and the second item from the second shopping cart. In operation 712, the merged shopping cart is provided to be displayed to the user. An example interface 810 showing a merged shopping cart is shown in FIG. 8B. The user may update the quantities of the items, remove items, and proceed to checkout to purchase the items.

The following examples describe various embodiments of methods, machine-readable media, and systems (e.g., machines, devices, or other apparatus) discussed herein.

EXAMPLE 1

A server computer comprising:
  a processor; and
  a computer-readable medium coupled with the processor, the computer-readable medium comprising instructions stored thereon that are executable by the processor to cause a computing device to perform operations comprising:
    receiving input for a message, including a comment from a user, in a first zone of a message area of a graphical user interface of a first interface, the graphical user interface comprising the message area comprising the first zone to allow the user to enter a comment and a second zone to allow the user to insert item details by accessing an item list generated from a database;
    detecting input in the comment from the user indicating a request for an item list associated with the input, wherein the input in the comment from the user includes a special character indicating the request for the item list;
    accessing the database to generate the item list based on the input entered by the user wherein the item list is displayed to the user;
    detecting a selected first item in the item list displayed to the user;
    generating item details associated with the selected first item wherein the item details are inserted in the second zone of the message area of the graphical user interface;
    receiving an indication from the user to post the message including the first zone comprising user comments and the second zone comprising the item details;
    causing the message to be posted to a document to be accessed by other users;
    receiving, via the first interface, a request to add the selected first item to a first shopping cart;
    adding the selected first item to the first shopping cart;
    receiving, via a second interface, a request to add a second item to a second shopping cart;
    adding the second item to the second shopping cart;
    receiving a request from the user to check out;
    merging the first shopping cart and the second shopping cart to generate a merged shopping cart with items from the first shopping cart and the second shopping cart; and
    providing the merged shopping cart to be displayed to the user.

EXAMPLE 2

A server computer according to Example 1, wherein the item list is generated based on the user input after the special character.

EXAMPLE 3

A server computer according to any of the previous examples, wherein the item details inserted in the second zone of the message area include a mechanism for adding the selected item to a first shopping cart.

EXAMPLE 4

A server computer according to any of the previous examples, wherein information associated with the selected first item added to the shopping first cart is stored in an http session associated with the user.

EXAMPLE 5

A server computer according to any of the previous examples, wherein information associated with the second item added to the second shopping cart is stored in an http session associated with the user.

EXAMPLE 6

A server computer according to any of the previous examples, wherein merging the first shopping cart and the second shopping cart to generate a merged shopping cart with items from the first shopping cart and the second shopping cart comprises:
  accessing http session data to get information associated with the first shopping cart and information associated with the second shopping cart; and combining the information associated with the first shopping cart and the information associated with the second shopping cart into the merged shopping cart.

EXAMPLE 7

A server computer according to any of the previous examples, wherein generating the item list based on the input entered by the user comprises accessing an index to determine relevant items to include in the item list.

EXAMPLE 8

A server computer according to any of the previous examples, wherein before receiving a request for the item list, the operations comprise:
  retrieving a third party item list from a third party server;
  indexing the third party item list and storing the indexed third party item list;
  retrieving third party item details associated with the third party item list; and
  storing the third party item details.

EXAMPLE 9

A server computer according to any of the previous examples, wherein the third party item list and the third party item details are periodically updated.

EXAMPLE 10

A server computer according to any of the previous examples, wherein periodically updating the third party item list and third party item details includes:
  retrieving an updated third party item list from the third party server;
  retrieving an associated item list from a database;
  comparing the updated third party item list from the third party server and the associated item list from the database; and
  updating the third party item list in the database based on a determination that there are differences between the updated third party item list from the third party server and the associated item list from the database.

EXAMPLE 11

A server computer according to any of the previous examples, the
operations further comprising:
receiving a request from the third party server to update the third party item details; and
updating the associated item details stored in the database based on the updates indicated in the request.

EXAMPLE 12

A method comprising:
receiving, by a server computer, input for a message, including a comment from a user, in a first zone of a message area of a graphical user interface of a first interface, the graphical user interface comprising the message area comprising the first zone to allow the user to enter a comment and a second zone to allow the user to insert item details by accessing an item list generated from a database;
detecting input in the comment from the user indicating a request for an item list associated with the input, wherein the input in the comment from the user includes a special character indicating the request for the item list;
accessing the database to generate the item list based on the input entered by the user wherein the item list is displayed to the user;
detecting a selected first item in the item list displayed to the user;
generating item details associated with the selected first item wherein the item details are inserted in the second zone of the message area of the graphical user interface;
receiving an indication from the user to post the message including the first zone comprising user comments and the second zone comprising the item details;
causing the message to be posted to a document to be accessed by other users;
receiving, via the first interface, a request to add the selected first item to a first shopping cart;
adding the selected first item to the first shopping cart;
receiving, via a second interface, a request to add a second item to a second shopping cart;
adding the second item to the second shopping cart;
receiving a request from the user to check out;
merging the first shopping cart and the second shopping cart to generate a merged shopping cart with items from the first shopping cart and the second shopping cart; and
providing the merged shopping cart to be displayed to the user.

EXAMPLE 13

A method according to any of the previous examples, wherein the item list is generated based on the user input after the special character.

EXAMPLE 14

A method according to any of the previous examples, wherein the item details inserted in the second zone of the message area include a mechanism for adding the selected item to a first shopping cart.

EXAMPLE 15

A method according to any of the previous examples, wherein information associated with the selected first item added to the shopping first cart is stored in an http session associated with the user.

EXAMPLE 16

A method according to any of the previous examples, wherein information associated with the second item added to the second shopping cart is stored in an http session associated with the user.

EXAMPLE 17

A method according to any of the previous examples, wherein merging the first shopping cart and the second shopping cart to generate a merged shopping cart with items from the first shopping cart and the second shopping cart comprises:
accessing http session data to get information associated with the first shopping cart and information associated with the second shopping cart; and
combining the information associated with the first shopping cart and the information associated with the second shopping cart into the merged shopping cart.

EXAMPLE 18

A method according to any of the previous examples, wherein before receiving a request for the item list, the method comprises:
retrieving a third party item list from a third party server;
indexing the third party item list and storing the indexed third party item list; retrieving third party item details associated with the third party item list; and
storing the third party item details.

EXAMPLE 19

A method according to any of the previous examples, wherein the third party item list and the third party item details are periodically updated, and wherein periodically updating the third party item list and third party item details includes:
retrieving an updated third party item list from the third party server;
retrieving an associated item list from a database;
comparing the updated third party item list from the third party server and the associated item list from the database; and
updating the third party item list in the database based on a determination that there are differences between the updated third party item list from the third party server and the associated item list from the database.

EXAMPLE 20

A non-transitory computer-readable medium comprising instructions stored thereon that are executable by at least one processor to cause a computing device to perform operations comprising:
receiving input for a message, including a comment from a user, in a first zone of a message area of a graphical user interface of a first interface, the graphical user interface comprising the message area comprising the first zone to allow the user to enter a comment and a second zone to allow the user to insert item details by accessing an item list generated from a database;

detecting input in the comment from the user indicating a request for an item list associated with the input, wherein the input in the comment from the user includes a special character indicating the request for the item list;

accessing the database to generate the item list based on the input entered by the user wherein the item list is displayed to the user;

detecting a selected first item in the item list displayed to the user;

generating item details associated with the selected first item wherein the item details are inserted in the second zone of the message area of the graphical user interface;

receiving an indication from the user to post the message including the first zone comprising user comments and the second zone comprising the item details;

causing the message to be posted to a document to be accessed by other users;

receiving, via the first interface, a request to add the selected first item to a first shopping cart;

adding the selected first item to the first shopping cart;

receiving, via a second interface, a request to add a second item to a second shopping cart;

adding the second item to the second shopping cart;

receiving a request from the user to check out;

merging the first shopping cart and the second shopping cart to generate a merged shopping cart with items from the first shopping cart and the second shopping cart; and providing the merged shopping cart to be displayed to the user.

Figure 9:
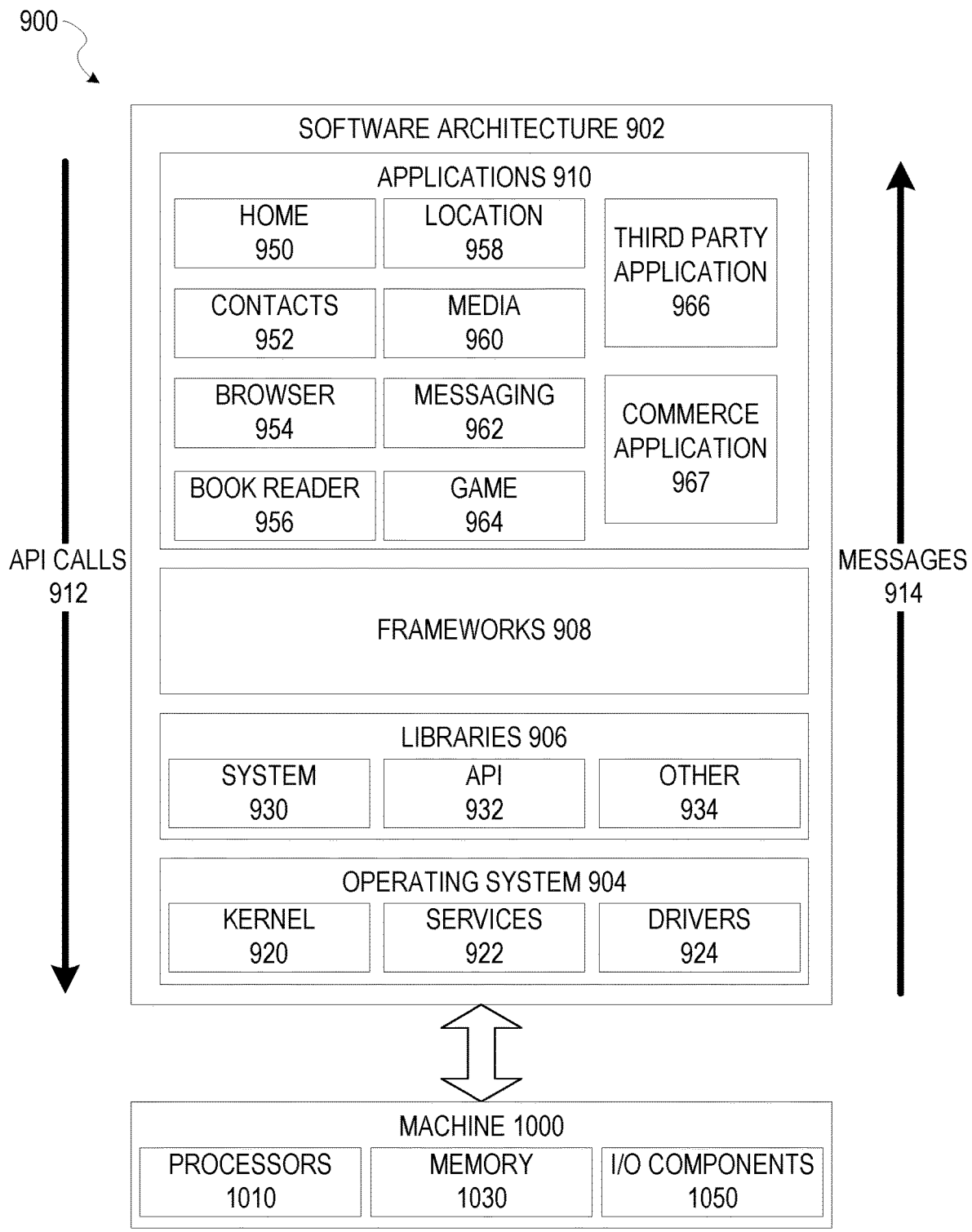
FIG. 9 is a block diagram illustrating an example of a software architecture that may be installed on a machine, according to some example embodiments.

FIG. 9 is a block diagram 900 illustrating software architecture 902, which can be installed on any one or more of the devices described above. For example, in various embodiments, client devices 110 and server systems 130, 102, 120, 122, and 124 may be implemented using some or all of the elements of software architecture 902. FIG. 9 is merely a non-limiting example of a software architecture, and it will be appreciated that many other architectures can be implemented to facilitate the functionality described herein. In various embodiments, the software architecture 902 is implemented by hardware such as machine 1000 of FIG. 10 that includes processors 1010, memory 1030, and I/O components 1050. In this example, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party applications 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 966 can invoke the API calls 912 provided by the operating system 904 to facilitate functionality described herein.

Some embodiments may particularly include a commerce application 967. In certain embodiments, this may be a stand-alone application that operates to manage communications with a server system such as third party servers 130 or server system 102. In other embodiments, this functionality may be integrated with another application such as a browser application 954 or another such application. Commerce application 967 may request and display various types of information related to items (e.g., products and services), and may provide the capability for a user to input data related to items via a touch interface, keyboard, or using a camera device of machine 1000, communication with a server system via I/O components 1050, and receipt and storage of data in memory 1030. Presentation of information related to items, and user inputs associated with item information, may be managed by commerce application 967 using different frameworks 908, library 906 elements, or operating system 904 elements operating on a machine 1000.

Figure 10:
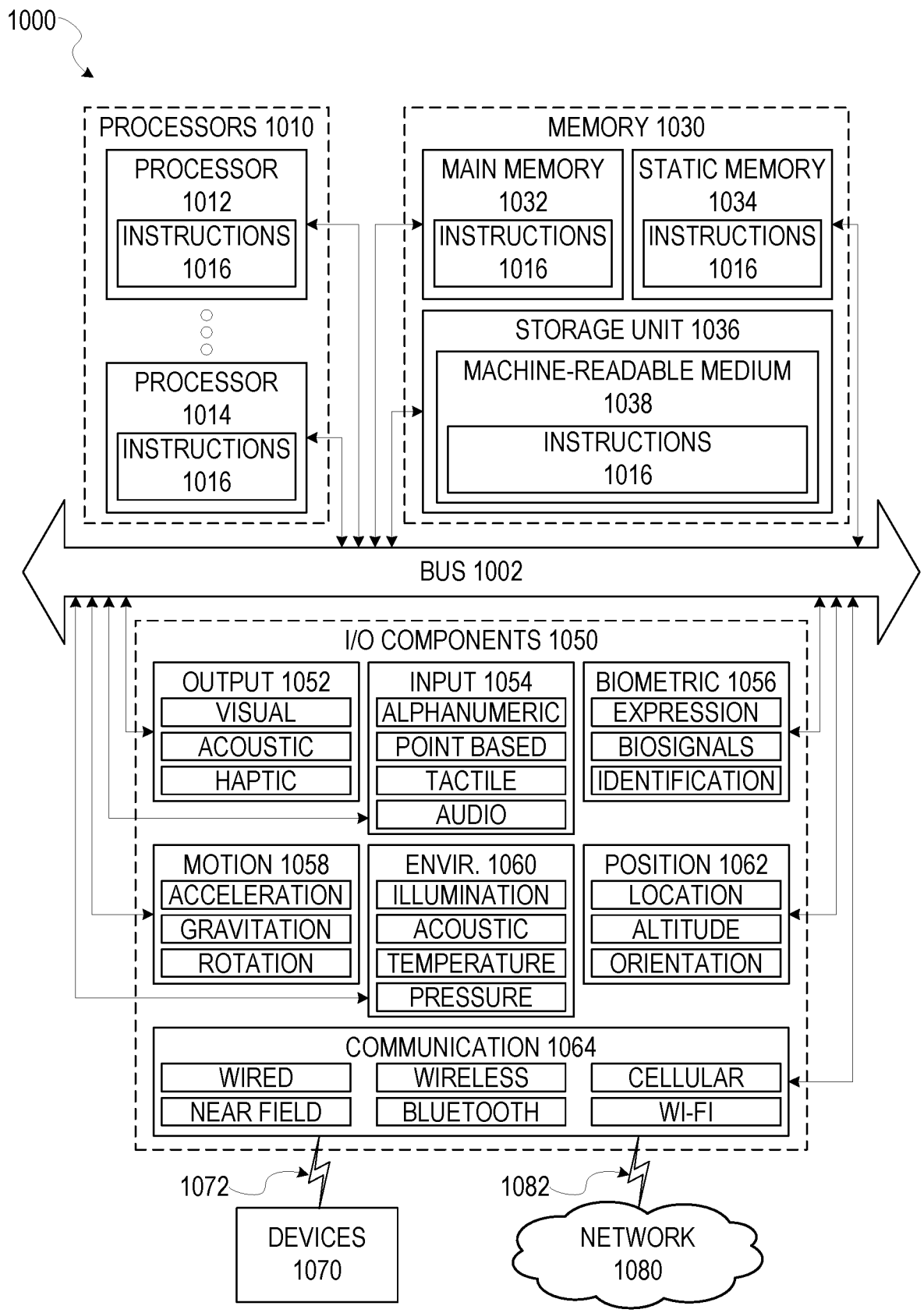
FIG. 10 illustrates a diagrammatic representation of a machine, in the form of a computer system, within which a set of instructions may be executed for causing the machine to perform any one or more of the methodologies discussed herein, according to an example embodiment.

FIG. 10 is a block diagram illustrating components of a machine 1000, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application 910, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine 130, 102, 120, 122, 124, etc., or a client device 110 in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1012 and a processor 1014 that may execute the instructions 1016. The term "processor" is intended to include multi-core processors 1010 that may comprise two or more independent processors 1012, 1014 (also referred to as "cores") that can execute instructions 1016 contemporaneously. Although FIG. 10 shows multiple processors 1010, the machine 1000 may include a single processor 1010 with a single core, a single processor 1010 with multiple cores (e.g., a multi-core processor 1010), multiple processors 1012, 1014 with a single core, multiple processors 1012, 1014 with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown, in an example embodiment, to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions 1016, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1070 may be another machine 1000 or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium 1038 is incapable of movement; the medium 1038 should be considered as being transportable from one physical location to another. Additionally, since the machine-readable medium 1038 is tangible, the medium 1038 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A server computer comprising:
a memory that stores instructions; and
one or more processors configured by the instructions to perform operations comprising:
receiving input for a message, including a comment from a user, in a first zone of a message area of a graphical user interface of a first interface, the graphical user interface comprising the message area comprising the first zone to allow the user to enter a comment and a second zone to allow the user to insert item details by accessing an item list generated from a database;
detecting input in the comment from the user indicating a request for an item list associated with the input;
accessing the database to generate the item list based on the input entered by the user wherein the item list is displayed to the user;
detecting a selected first item in the item list displayed to the user;
generating item details associated with the selected first item wherein the item details are inserted in the second zone of the message area of the graphical user interface;
receiving an indication from the user to post the message including the first zone comprising user comments and the second zone comprising the item details; and
causing the message to be posted to a document to be accessed by other users.

2. The server computer of claim 1, wherein the input in the comment from the user includes a special character indicating the request for the item list.

3. The server computer of claim 2, wherein the item list is generated based on the user input after the special character.

4. The server computer of claim 1, wherein the item details inserted in the second zone of the message area include a mechanism for adding the selected first item to a first shopping cart.

5. The server computer of claim 1, wherein information associated with the selected first item added to the shopping first cart is stored in an http session associated with the user.

6. The server computer of claim 5, the operations further comprising:
receiving a request to add a second item to a second shopping cart; and
adding the second item to the second shopping cart;
wherein information associated with the second item added to the second shopping cart is stored in the http session associated with the user.

7. The server computer of claim 6, the operations further comprising:
merging the first shopping cart and the second shopping cart to generate a merged shopping cart with items from the first shopping cart and the second shopping cart; and
providing the merged shopping car to be displayed to the user.

8. The server computer of claim 1, wherein generating the item list based on the input entered by the user comprises accessing an index to determine relevant items to include in the item list.

9. The server computer of claim 1, wherein before receiving a request for the item list, the operations comprise:
retrieving a third party item list from a third party server;
indexing the third party item list and storing the indexed third party item list;
retrieving third party item details associated with the third party item list; and
storing the third party item details.

10. The server computer of claim 8, wherein the third party item list and the third party item details are periodically updated.

11. The server computer of claim 9, wherein periodically updating the third party item list and third party item details includes:
retrieving an updated third party item list from the third party server;
retrieving an associated item list from a database;
comparing the updated third party item list from the third party server and the associated item list from the database; and
updating the third party item list in the database based on a determination that there are differences between the updated third party item list from the third party server and the associated item list from the database.

12. The server computer of claim 8, the operations further comprising:
- receiving a request from the third party server to update the third party item details; and
- updating the associated item details stored in the database based on the updates indicated in the request.

13. A method comprising:
- receiving, by a server computer input for a message, including a comment from a user, in a first zone of a message area of a graphical user interface of a first interface, the graphical user interface comprising the message area comprising the first zone to allow the user to enter a comment and a second zone to allow the user to insert item details by accessing an item list generated from a database;
- detecting input in the comment from the user indicating a request for an item list associated with the input;
- accessing the database to generate the item list based on the input entered by the user wherein the item list is displayed to the user;
- detecting a selected first item in the item list displayed to the user;
- generating item details associated with the selected first item wherein the item details are inserted in the second zone of the message area of the graphical user interface;
- receiving an indication from the user to post the message including the first zone comprising user comments and the second zone comprising the item details; and
- causing the message to be posted to a document to be accessed by other users.

14. The method of claim 13, wherein the input in the comment from the user includes a special character indicating the request for the item list.

15. The method of claim 14, wherein the item list is generated based on the user input after the special character.

16. The method of claim 13, wherein the item details inserted in the second zone of the message area include a mechanism for adding the selected first item to a first shopping cart.

17. The method of claim 13, wherein information associated with the selected first item added to the shopping first cart is stored in an http session associated with the user.

18. The method of claim 17, further comprising:
- receiving a request to add a second item to a second shopping cart; and
- adding the second item to the second shopping cart;
- wherein information associated with the second item added to the second shopping cart is stored in the http session associated with the user.

19. The method of claim 18, further comprising:
- merging the first shopping cart and the second shopping cart to generate a merged shopping cart with items from the first shopping cart and the second shopping cart; and
- providing the merged shopping car to be displayed to the user.

20. A non-transitory computer-readable medium comprising instructions stored thereon that are executable by at least one processor to cause a computing device to perform operations comprising:
- receiving input for a message, including a comment from a user, in a first zone of a message area of a graphical user interface of a first interface, the graphical user interface comprising the message area comprising the first zone to al low the user to enter a comment and a second zone to allow the user to insert item details by accessing an item list generated from a database;
- detecting input in the comment from the user indicating a request for an item list associated with the input;
- accessing the database to generate the item list based on the input entered by the user wherein the item list is displayed to the user;
- detecting a selected first item in the item list displayed to the user;
- generating item details associated with the selected first item wherein the item details are inserted in the second zone of the message area of the graphical user interface;
- receiving an indication from the user to post the message including the first zone comprising user comments and the second zone comprising the item details; and
- causing the message to be posted to a document to be accessed by other users.

* * * * *